United States Patent Office 3,378,558
Patented Apr. 16, 1968

3,378,558
DOUBLE ALKALI METAL SALT OF THE-OPHYLLINE AND CYCLOHEXANESULFAMIC ACID
James D. Keiser and Donald G. Midyett, Seymour, Ind., assignors to The Central Pharmacal Company, Seymour, Ind.
No Drawing. Filed May 1, 1964, Ser. No. 364,294
2 Claims. (Cl. 260—253)

This invention relates to a new form of theophylline of improved utility suitable for use in therapeutic compositions, and to methods of producing same. More particularly, it relates to the double alkali metal salt of theophylline and cyclohexanesulfamic acid and compositions containing same and to methods of producing same.

Theophylline is a xanthine base which occurs in small quantities in the mother liquors after the extraction of caffeine from tea. Usually it is produced by synthetic means. It occurs in the form of a white, odorless, stable in air, crystalline powder, bitter in taste, and of relatively low solubility in water, but freely soluble in solutions of alkali hydroxides and in ammonia. Theophylline is useful as a diuretic because of its inhibition of renal tubular absorption, its increase of cardiac output and its dilation of afferent arterioles, and is particularly of value in cases of congestive heart failure where renal function is good. Its diuretic action is greatest in patients with arteriosclerotic heart disease. It is likewise helpful in the dyspnea of bronchial asthma where its relaxation of the bronchial and other smooth musculature is of value.

The clinical use of theophylline has been limited by two important factors, namely, its bitterness and low solubility which either limit materially the size of the doses that can be administered without requiring unusually large or frequent doses. Many efforts have, therefore, been made to find means of reducing or obviating the disagreeable taste of the drug, and to find means of increasing the active dosage without at the same time greatly increasing the volume of the dosage administered. In an effort to overcome these objections clinicians have turned to various derivatives of theophylline. The first of these was the ethylenediamine derivative of theophylline which largely supplanted theophylline. Still later, a composition comprising sodium theophyllinate and glycine was introduced to the trade and gained much favor. Both of these either released theophylline in the body, or else gave substantially the same effect as theophylline when administered. Both were of increased solubility over theophylline itself, thus permitting increased dosages of the active ingredient theophylline but neither was entirely satisfactory for administration because still not sufficiently soluble to permit the administration of adequate dosages of the active theophylline without using excessive doses of the drug and because of the bitterness of the theophylline derivatives made the drug products unpalatable, particularly to children. Extensive efforts have therefore been continued to find forms of theophylline less objectionable from these points of view and which were at the same time satisfactory from the point of view of theophylline effect.

It has now been discovered that the previous disadvantages in theophylline therapy was largely overcome by the use of cyclohexanesulfamic acid derivative of sodium theophylline in place of the theophylline forms previously available, this new derivative being relatively free from the bitterness of previously known forms of theophylline and also possessing the important advantage of materially increased solubility over previously known forms of theophylline suitable for therapeutic use, thus for the first time permitting the administration of adequate dosages of theophylline without at the same time increasing the volume or frequency of the doses.

The preparation of the sodium or other alkali metal salt of the cyclohexanesulfamic acid derivative of theophylline is illustrated by the following specific examples. It is to be understood, however, that the invention is not limited to the specific procedures or amounts disclosed but that the usual variations known to one skilled in the art may be followed without departing from the concept of the invention which is limited only as shown by the appended claims, as for example, potassium hydroxide or other alkali metal hydroxides can be substituted for the sodium hydroxide in the appended example. Applicants have referred to their new theophylline composition as the "double alkali metal salt of theophylline and cyclohexanesulfamic acid" since the products of mixtures of solutions of alkali metal theophylline and other salts are so referred to in the literature. (cf. The Merck Index, 7th Edition, pp. 1030–1031). It is understood, however, that applicants do not restrict themselves to any particular theory of reaction.

Example I

Forty grams (⅕ mole) of theophylline N.F. was dissolved in 200 ml. of N/1. NaOH (8.00 grams—⅕ mole). To this mixture was added 500 ml. of water and the resulting mixture well stirred. To this solution was then added 10.248 gms. (1/17.5 mole) of cyclohexanesulfamic acid and the resulting solution again well stirred. The resulting solution was then filtered through a No. 1 Whatman filter paper, and the resulting clear solution evaporated at a temperature not substantially exceeding 70° C. Approximately 50 grams (86.38%) of the double sodium salt of theophylline and cyclohexanesulfamic acid in the form of a white powder containing 70% theophylline was thus obtained.

Example II

In this experiment the products were reacted as in Example I, using the following ratios:

Theophylline (1/50 mole) _____ gm__ 3.9638
NaOH (20 ml. N/1. NaOH) (1/50 mole) ___gm__ 0.8000
Cyclohexanesulfamic acid (1/50 mole) _____gm__ 3.5848
Distilled water _____ ml__ 50.000

The theophylline separated from the solution and was removed by filtration through No. 1 filter paper. The resulting filtrate was then evaporated to dryness at 70° C. Yield of the double sodium salt of theophylline and cyclohexanesulfamic acid—38.21%; theophylline content —9.16%, solubility in water—85.74 mg. (equivalent to 7.8542 mg. theophylline) dissolved in 1.00 ml. of water at room temperature.

Example III

In this experiment the reactants were used in the amounts set out below, and the operation carried out as in Example II.

Theophylline (1/50 mole) _____ gm__ 3.9638
NaOH (20 ml. N/1. NaOH) (1/50 mole) ___gm__ 0.8000
Cyclohexanesulfamic acid (1/50 mole) _____gm__ 2.3899
Distilled water _____ ml__ 50.000

Yield of double sodium salt of theophylline and cyclohexanesulfamic acid—60.95%, containing 44.51% theophylline; solubility in water—145.5796 mg. (equivalent of 64.7975 mg. theophylline) dissolved in 1.00 ml. of water.

Example IV

In this experiment the operation was carried out as in the previous experiments using the following reactants:

Theophylline (1/50 mole) _____gm__ 3.9638
NaOH (20 ml. N/l.NaOH) (1/50 mole) ___gm__ 0.8000
Cyclohexanesulfamic acid (1/100 mole) ____gm__ 1.7924
Distilled water _____ml__ 50.000

Yield of double sodium salt of theophylline and cyclohexanesulfamic acid—79.16%, which was soluble in water to the extent of 137.1444 mg. in 1.00 ml. water (equivalent of 78.5426 mg. theophylline).

When the mole ratio of the cyclohexanesulfamic acid was reduced to 1/125 and lower, other factors in the operation remaining the same, the theophylline did not separate from the solution. In the following experiments 1/50 mole NaOH (20 ml. N/l. NaOH) (1/50 mole) __gm__ 0.8000 theophylline, and 1/50 mole NaOH were reacted with the indicated number of moles of cyclohexanesulfamic acid. The table below shows the mole ratio of cyclohexanesulfamic acid used and the amounts of the double sodium salt of theophylline and cyclohexanesulfamic acid produced, together with the theophylline content thereof and solubility.

formulate oral and chewable theophylline products. Because of its greater solubility it is possible to administer larger doses of theophylline in smaller volumes, which is a very distinct advantage where larger doses of the active ingredient are required.

While the double sodium salt of theophylline and cyclohexanesulfamic acid have been specifically referred to in the examples, it should be understood that the other alkali metal salts can be similarly produced and have similar properties and can be similarly used. For example, potassium, or other alkali metal hydroxide can be substituted for the sodium hydroxide used in the examples, and the corresponding double salt of potassium, or other alkali metal salt of theophylline and cyclohexanesulfamic acid produced.

The double sodium salt of theophylline and cyclohexanesulfamic acid is particularly useful in bronchodilator-expectorant compositions taken orally and where taste is an important factor. A composition of this character is shown beow:

|  | Mg. per 30 ml. |
|---|---|
| Double sodium salt of theophylline and cyclohexanesulfamic acid | 470 |
| Codeine phosphate | 30 |
| Ephedrine hydrochloride | 50 |
| Glyceryl guaicolate | 200 |
| Methapyridine hydrochloride | 50 |

Double sodium salt of theophylline and cyclohexane-

TABLE

| Exp. No. | Moles of cyclohexanesulfamic used | Double sodium salt of Theophylline and cyclohexanesulfamic acid | Theophylline residue, percent | Double sodium salt of Theophylline and cyclohexanesulfamic acid sol. in 1 ml. water, mg. | Theophylline equivalent, mg. |
|---|---|---|---|---|---|
| 5 | 1/125 | 84.63 | 66.11 | 133.6568 | 88.3606 |
| 6 | 1/150 | 85.76 | 68.72 | 128.5790 | 88.3595 |
| 7 | 1/175 | 86.38 | 70.00 | 134.6445 | 94.2512 |
| 8 | 1/200 | 87.50 | 70.03 | 114.9595 | 80.5062 |
| 9 | 1/225 | 86.32 | 72.65 | 110.8137 | 80.5062 |

Example X

In this experiment, 3.9638 gm. of theophylline (1/50 mole) and 1.0248 gm. (1/175 mole) of cyclohexanesulfamic acid were added to 50 ml. of water. The theophylline did not go into solution and the pH of the mixture was 1.50. After addition of 20 ml. of N/l. NaOH (0.8 gm.—1/50 mole) the theophylline went into solution and the operation was completed as in previous experiments, the results of the experiment being similar to those of Experiment 7. The double sodium salt of theophylline and cyclohexanesulfamic acid, prepared as above described, had no melting point but darkened at 280° C. and the entire mass became black at approximately 300° C. It was soluble in water to the extent of approximately 13.46%, thus permitting the preparation of a palatable solution containing 9.42% theophylline whereas only 0.8% theophylline per se can be dissolved in water. The salt, and solutions thereof were found to be quite pleasant with marked sweatness in taste as compared to the taste of theophylline itself and other previously known salts and compounds thereof. In comparison to the currently used theophylline derivative, the double sodium salt of theophylline and cyclohexanesulfamic acid has the distinct advantage of being 10–12 times as sweet as the previously known product.

The improved flavor and great solubility of the double sodium salt of theophylline and cyclohexanesulfamic acid give it decided utility over any previously known theophylline product. The improved flavor makes it possible to sulfamic acid is also useful in other combinations where the special effects of theophylline are required.

For asthma: Mg. per tab.
Double sodium salt of theophylline and cyclohexanesulfamic acid (Yielding 165 mg. theophylline) _____ 235

For angina:
Double sodium salt of theophylline and cyclohexanesulfamic acid _____ 235
Pentaerythritol tetranitrate _____ 20

What is claimed is:
1. The double alkali metal salt of theophylline and cyclohexanesulfamic acid.
2. The double sodium salt of theophylline and cyclohexanesulfamic acid.

References Cited

UNITED STATES PATENTS 2,519,450  8/1950  Grote et al. _____ 260—253
2,711,409  6/1955  Holbert et al. _____ 260—253

ALEX MAZEL, *Primary Examiner.*

HENRY R. JILES, *Examiner.*

JAMES W. ADAMS, MARY U. O'BRIEN,
*Assistant Examiners.*